United States Patent
Vachuska et al.

(10) Patent No.: US 10,142,244 B2
(45) Date of Patent: *Nov. 27, 2018

(54) MODIFYING A PRIORITY FOR AT LEAST ONE FLOW CLASS OF AN APPLICATION ON A SOFTWARE DEFINED NETWORKING CONTROLLER

(71) Applicant: HEWLETT PACKARD ENTERPRISE DEVELOPMENT LP, Houston, TX (US)

(72) Inventors: Thomas Vachuska, Roseville, CA (US); Simon Hunt, Roseville, CA (US); Uyen Chau, Roseville, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/117,321

(22) PCT Filed: Apr. 3, 2014

(86) PCT No.: PCT/US2014/032875
§ 371 (c)(1),
(2) Date: Aug. 8, 2016

(87) PCT Pub. No.: WO2015/152930
PCT Pub. Date: Oct. 8, 2015

(65) Prior Publication Data
US 2016/0353461 A1    Dec. 1, 2016

(51) Int. Cl.
*H04L 12/851* (2013.01)
*H04L 12/64* (2006.01)
(Continued)

(52) U.S. Cl.
CPC ...... *H04L 47/2441* (2013.01); *H04L 12/6418* (2013.01); *H04L 45/38* (2013.01);
(Continued)

(58) Field of Classification Search
CPC ......... H04L 45/02; H04L 45/38; H04L 45/42; H04L 45/64; H04L 41/0813;
(Continued)

(56) References Cited

U.S. PATENT DOCUMENTS 6,658,485 B1    12/2003  Baber et al.
2004/0057425 A1    3/2004  Brouwer et al.
(Continued)

FOREIGN PATENT DOCUMENTS

EP    0618713 B1    5/2001

OTHER PUBLICATIONS

International Search Report and Written Opinion, International Application No. PCT/US2014/032875, dated Dec. 12, 2014, pp. 1-10, KIPO.
Phillip Porras et al., "A Security Enforcement Kernel for OpenFlow Networks," Aug. 13, 2012, pp. 1-6, ACM.
William Stallings, "Software-Defined Networks and OpenFlow," The Internet Protocol Journal, Mar. 29, 2013, pp. 1-7, vol. 16, No. 1, Cisco.
Zafar Qazi et al., "Application Awareness in SDN," Aug. 2013, pp. 1-2, ACM.

*Primary Examiner* — Peter Chen
(74) *Attorney, Agent, or Firm* — Rathe Linderbaum LLP

(57) ABSTRACT

Modifying a priority for at least one flow class of an application includes registering flow classes for an application with a SDN controller, determining, with the SDN controller, a priority for each of the flow classes based on other installed applications and network services on the SDN controller, modifying, based on an event, the priority for at least one of the flow classes of the application by (Continued)

mapping a priority key associated with the priority to a new priority value, receiving, from the application, at least one flow modification rule using a priority key as the priority, and validating the at least one flow modification rule against registered parameters of at least one of the flow classes of the application to determine a flow of traffic based on the priority.

20 Claims, 5 Drawing Sheets

(51) Int. Cl.
    *H04L 12/721*     (2013.01)
    *H04L 12/715*     (2013.01)
    *H04L 12/717*     (2013.01)
    *H04W 72/10*     (2009.01)

(52) U.S. Cl.
    CPC .............. *H04L 45/42* (2013.01); *H04L 45/64* (2013.01); *H04L 47/2433* (2013.01); *H04W 72/10* (2013.01)

(58) Field of Classification Search
    CPC ............. H04L 41/0816; H04L 41/0893; H04L 41/0896; H04L 12/6418; H04L 47/10; H04L 47/125; H04L 47/2441; H04L 47/2433; H04L 47/2483; H04L 47/24; H04W 72/10; H04W 28/02; H04W 28/10
    See application file for complete search history.

(56) References Cited

U.S. PATENT DOCUMENTS

| | | |
|---|---|---|
| 2010/0014431 A1 | 1/2010 | Bajpay et al. |
| 2010/0098069 A1 | 4/2010 | Samarasingile |
| 2012/0155264 A1 | 6/2012 | Sharma et al. |
| 2013/0124707 A1* | 5/2013 | Ananthapadmanabha ................. H04L 45/7457 709/223 |
| 2013/0266007 A1 | 10/2013 | Kumbhare et al. |
| 2014/0052836 A1* | 2/2014 | Nguyen ................ H04L 45/306 709/223 |
| 2014/0075519 A1* | 3/2014 | Porras ..................... H04L 63/20 726/4 |
| 2015/0026313 A1* | 1/2015 | Chawla ................... H04L 47/24 709/220 |
| 2015/0063144 A1* | 3/2015 | Kozat ................... H04W 24/02 370/252 |

* cited by examiner

MODIFYING A PRIORITY FOR AT LEAST ONE FLOW CLASS OF AN APPLICATION ON A SOFTWARE DEFINED NETWORKING CONTROLLER

RELATED APPLICATIONS

The present application relates to International Patent Application No. PCT/US2014/032868 filed Apr. 3, 2014, entitled "Prioritizing at Least One Flow Class for an Application on a Software Defined Networking Controller," which is incorporated herein by reference in its entirety.

BACKGROUND

A software-defined networking (SDN) network allows network administrators to orchestrate and automate control of network services, such as network components and applications through abstraction of a lower level functionality. A SDN controller in the SDN network makes decisions about how network traffic is processed by instructing switches within the SDN network to define forwarding behavior of data packets traveling across the SDN network according to priorities set by high-level policy or business logic.

BRIEF DESCRIPTION OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
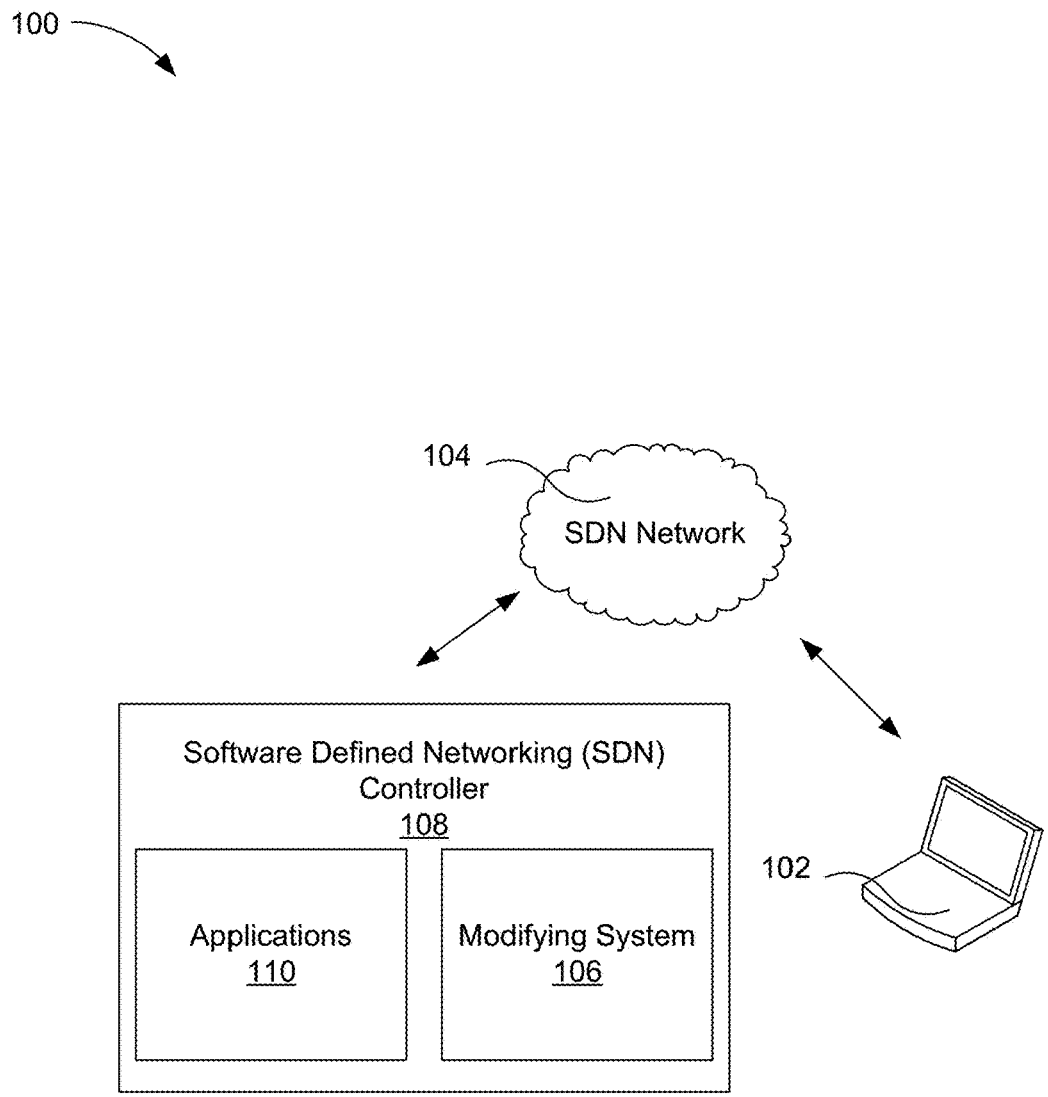
FIG. 1 is a diagram of an example of a system for modifying a priority for at least one flow class of an application, according to one example of principles described herein.

As mentioned above, the SDN network allows network administrators to orchestrate and automate control of network services, such as network components and applications through abstraction of a lower level functionality. Further, a number of applications and network services may be installed on the SDN controller. In one example, the applications may include a priority to define forwarding behavior of data packets traveling across the SDN network according to the priority for the application. Based on the priority, the SDN controller in the SDN network makes decisions about how network traffic is processed by instructing switches within the SDN network.

Although a number of applications and network services may be installed on the SDN controller, the applications are not aware of each other on the SDN controller. Since the applications are not aware of each other on the SDN controller, the applications are not able to account for each other's business logic. Further, dynamic changes to the SDN network may further change priorities for the applications. As a result, applications may have the same priority. This may result in conflicting priorities when multiple applications are making flow table modifications that are to be installed at the switches.

The principles described herein include a method for modifying a priority for at least one flow class of an application. Such a method includes registering flow classes for an application with a SDN controller, determining, with the SDN controller, a priority for each of the flow classes based on other installed applications and network services on the SDN controller, modifying, based on an event, the priority for the at least one flow class of the application by mapping a priority key associated with the priority to a new priority value, receiving, from the application, at least one flow modification rule using the priority key as the priority, and validating the at least one flow modification rule against registered parameters of at least one of the flow classes of the application to determine a flow of traffic based on the priority. Such a method allows a priority for an application to be reprioritized based on events. As a result, the method allows an application to request flow modification rules for a switch without the request conflicting with other applications installed on the SDN controller even if there are dynamic changes to the SDN network.

In the present specification and in the appended claims, the term "SDN network" is meant to be understood broadly as a combination of hardware and software that includes a SDN controller, a number of switches, routers, wireless access points, and instructions is processed by the switches, routers, and wireless access points to define the forwarding behavior of data packets. Further, the term switch can apply equally to a wide area network (WAN) router, wireless access point, or other SDN networking device. In one example, the SDN controller in the SDN network makes decisions about how network traffic is processed by instructing switches within the SDN network to define the forwarding behavior of data packets traveling across the SDN network.

In the present specification and in the appended claims, the term "flow class" is meant to be understood broadly as a description of flow modification rules an application requests from a SDN controller and a priority at which the flow modification rules are to be installed at a switch. In one example, the flow modification rules may include how traffic flows in a SDN network. For example, the flow modification rules may describe how to forward packets of data from one node to another node.

In the present specification and in the appended claims, the term "priority" is meant to be understood broadly as an order of evaluation for flow modification rules at a switch. In one example, the higher the priority the earlier the flow modification rules is executed at the switch. In one example, the priority may be a range from 0 to 10, where 0 indicates the lowest priority and 10 indicates the highest priority. In another example, the priority may be expressed symbolically. For example, a priority with the lowest significance may be assigned a low priority. A priority with the highest significance may be assigned a high priority.

In the present specification and in the appended claims, the term "priority key" is meant to be understood broadly as a ticket that the application includes when sending a request for a flow modification rule. In one example, the priority key may be used to identify a user who owns a particular flow class, lookup appropriate metadata, or combinations thereof.

In the present specification and in the appended claims, the term "event" is meant to be understood broadly as an internal or external change to the SDN network. In one example, the event may be a user overriding a priority's priority key to be associated with a new priority value via a file or a user interface (UI). In another example, the event may be based on modification to the SDN network such as adding or removing a switch from the SDN network.

Further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Referring now to the figures, FIG. 1 is a diagram of an example of a system for modifying a priority for at least one flow class of an application, according to one example of principles described herein. As will be described below, a modifying system is in communication with a network to register flow classes for an application with a SDN controller. Further, the modifying system determines, with the SDN controller, a priority for each of the flow classes based on other installed applications and network services on the SDN controller. The modifying system validates at least one flow modification rule against registered parameters of at least one of the flow classes of the application to determine a flow of traffic based on the priority.

As illustrated in FIG. 1, the system (100) includes a SDN controller (108). As will be described in other parts of this specification, the SDN controller (108) makes decisions about how network traffic is processed by instructing switches within the SDN network (104) to define the forwarding behavior of data packets traveling across the SDN network (104). In one example, the SDN controller (108) has a global view of the SDN network (104). For example, the SDN controller (108) may have a global view of the topology of the SDN network (104), the switches within the SDN network (104), user devices within the SDN network (104), other global views, or combinations thereof. As a result, the SDN controller (108) may forward data packets traveling across the SDN network (104) in an appropriate manner.

In one example, a number of applications (110) and network services may be installed on the SDN controller (104). The applications (110) may include priorities to define forwarding behavior of data packets traveling across the SDN network (104). Based on the priority for each of the applications (110), the SDN controller (108) in the SDN network (104) makes decisions about how network traffic is processed by instructing switches within the SDN network (104) to define forwarding behavior of data packets traveling across the SDN network (104). More information about the applications will be described in later parts of this specification.

As illustrated, the system (100) further includes a modifying system (106). The modifying system (106) registers the flow classes for the applications (110) with the SDN controller (108). By registering the flow classes for the applications (110) with the SDN controller (108), the applications (110) may be able to account for each other's business logic.

The modifying system (106) determines, with the SDN controller (108), a priority for each of the flow classes based on other installed applications and network services on the SDN controller (108). As a result, each of the applications (110) may be assigned a priority that will not conflict with another application's priority when a request for a flow modification rule is made. In one example, the request may be made as a flow modification message.

The modifying system (106) sends a priority key associated with the priority from the SDN controller (108) to the application. As will be described in other parts of this specification the priority key may be a ticket that the application includes when sending a request for a flow modification rule. In one example, the priority key may be used to identify a user who owns a particular flow class, lookup appropriate metadata, or combinations thereof.

The modifying system (106) modifies, based on an event, the priority for the at least one flow class of the applications (110) by mapping the priority key associated with the priority to a new priority value. In one example, the event may be a user overriding a priority's priority key to be associated with a new priority value via a file or a UI displayed on a user device (102). In another example, the event may be based on modification to the SDN network such as adding or removing a switch from the SDN network (104).

Further, the modifying system (106) receives, from the applications (110), at least one flow modification rule using the priority key as the priority. In one example, the modifying system (106) receives, from the applications (110), the at least one flow modification rule using a priority key as the priority when a request is made. In one example, the priority's priority key may be associated with the new priority value.

The modifying system (106) validates the at least one flow modification rule against registered parameters of at least one of the flow classes of the application to determine a flow of traffic based on the priority. In one example, the modifying system (106) approves the at least one flow class of the applications (110) or prohibits the at least one flow modification rule of the applications (110). More information about the modifying system (106) will be described later on in this specification.

While this example has been described with reference to the modifying system being located on the SDN controller, the modifying system may be located in any appropriate location according to the principles described herein. For example, the modifying system may be located in a user device, a server, a datacenter, over the network, other locations, or combinations thereof.

Further, while this example has been described with reference to the SDN controller being located over the network, the SDN controller may be located in any appropriate location. For example, the SDN controller may be located in the SDN network, in a datacenter, the modifying system, other locations, or combinations thereof. Still further, while this example has been described with reference to the system including one SDN controller, the system may include several SDN controllers. For example, the system may include three SDN controllers.

Further, while this example has been described with reference to the applications being installed on the SDN controller, the applications may be installed in any appropriate location. For example, the applications may be installed on a user device, a server, a datacenter, over the network, other locations, or combinations thereof. As a result, the applications may be installed externally or internally to the SDN controller.

Figure 2:
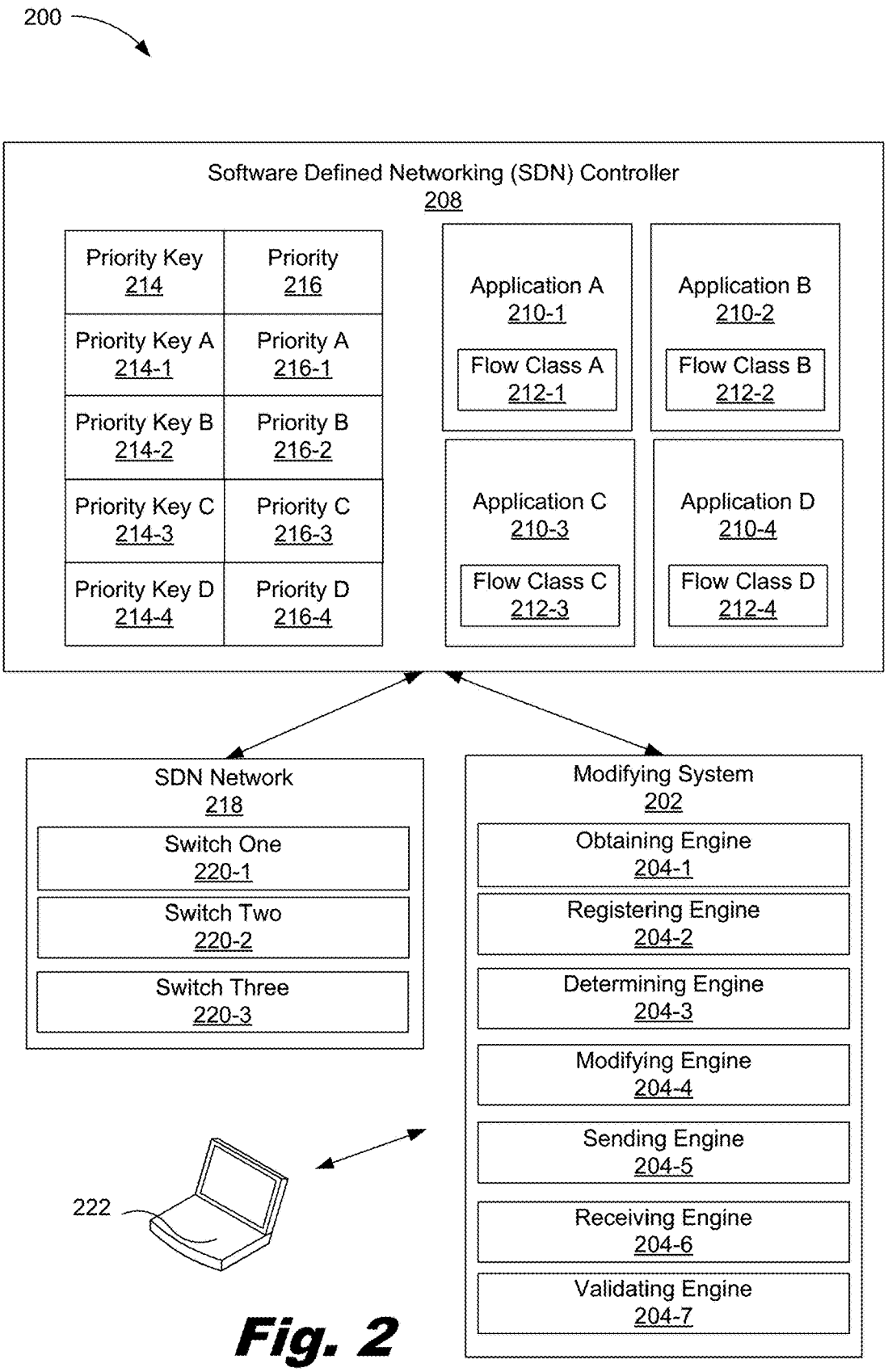
FIG. 2 is a diagram of an example of a system for modifying a priority for at least one flow class of an application, according to one example of principles described herein.

FIG. 2 is a diagram of an example of a system for modifying a priority for at least one flow class of an application, according to one example of principles described herein. As mentioned above, a modifying system is in communication with a network to register flow classes for an application with a SDN controller. Further, the modifying system determines, with the SDN controller, a priority for each of the flow classes based on other installed applications and network services on the SDN controller. Further, the modifying system modifies, based on an event, the priority for the at least one flow class of the application by mapping a priority key associated with the priority to a new priority value. The modifying system validates at least one flow modification rule against registered parameters of at least one of the flow classes of the application to determine a flow of traffic based on the priority.

As illustrated in FIG. 2, the system (200) includes an SDN controller (208). As mentioned above, a number of applications (210) and network services may be installed on the SDN controller (208) in memory (222). In other example, the applications (210) may be installed externally to the SDN controller (208). As illustrated, the SDN controller (208) includes four applications (210), namely application A (210-1), application B (210-2), application C (210-3), and application D (210-4).

In one example, the SDN controller (208) brokers priorities, such as OpenFlow rule priorities, for the applications (210) by having the applications (210) define their intent via flow classes. For example, application A (210-1) includes flow class A (212-1). Flow class A (212-1) captures a signature of the flow modification rules, such as OpenFlow rules, for Application A (210-1) that will be sent to the SDN controller (208). Similarly, application B (210-2) captures flow class B (212-2), application C (210-3) captures flow class C (212-3), and application D (210-4) captures flow class D (212-4).

As illustrated in FIG. 2, the system (200) includes a modifying system (202). In one example, the modifying system (202) includes a number of engines (204). The engines (204) refer to a combination of hardware and program instructions to perform a designated function. Each of the engines (204) may include a processor and memory. The program instructions are stored in the memory and cause the processor to execute the designated function of the engine.

As illustrated, the modifying system (202) includes a registering engine (204-2). The registering engine (204-2) registers flow classes for the application with a SDN controller (208). In this example, the registering engine (204-2) registers flow class A (212-1) for application A (210-1) with the SDN controller (208). Similarly, registering engine (204-2) registers flow class B (212-2) for application B (210-2), flow class C (212-3) for application C (210-3), and flow class D (212-4) for application D (210-4) with the SDN controller (208).

Further, the modifying system (202) includes a determining engine (204-3). The determining engine (204-3) determines, with the SDN controller (208), a priority for each of the flow classes (212) based on other installed applications (210) and network services on the SDN controller (208).

For example, the determining engine (204-3) may determine that flow class A (212-1) is to have a high priority based on the other applications (210). As a result, priority A (216-1), which is associated with flow class A (212-1), is given a high priority. In keeping with the given example, the determining engine (204-3) may determine that flow class B (212-2) is to have a medium-high priority. As a result, priority B (216-2), which is associated with flow class B (212-2), is given a medium-high priority. Further, the determining engine (204-3) may determine that flow class C (212-3) is to have a medium-low priority. As a result, priority C (216-3), which is associated with flow class C (212-3), is given a medium-low priority. Further, in this example, the determining engine (204-3) may determine that flow class D (212-4) is to have a low priority. As a result, priority D (216-4), which is associated with flow class D (212-4), is given a low priority.

As illustrated in FIG. 2, modifying system (202) includes a sending engine (204-5). The sending engine (204-5) sends the priority keys (214) associated with the priority (216) from the SDN controller (208) to the applications (210). For example, priority key A (214-1) that is associated with priority A (216-1) is sent from the SDN controller (208) to application A (210-1). In this example, priority key A (214-1) may be stored in memory (222) on application A (210-1). Similarly, this process may repeat for priority key B (214-2), priority key C (214-3), and priority key D (214-4).

As illustrated in FIG. 2, the modifying system (202) includes a modifying engine (204-4). The modifying engine (204-4) modifies, based on an event, the priority for the at least one flow class of the application by mapping the priority key associated with the priority to a new priority value. In this example, the priority for one flow class B (212-2) of the application B (210-2) may be modified. As a result, priority key B (214-2), associated with priority B (216-2) is mapped to a new priority value. In one example, the event may be a user overriding a priority to be a new priority via a file or a UI on a user device (222). In another example, the event may be based on modification to the SDN network such as adding or removing a switch from the SDN network. In this example, priority B (216-2) is the highest priority.

Further, the modifying system (202) includes a receiving engine (204-6). The receiving engine (204-6) receives, from the applications (210), at least one flow modification rule using the priority key (214) as the priority (216). For example, when application A desires to send a request to modify a flow modification rule, the receiving engine (204-5) receives, from application A (210-1), a flow modification rule for flow class A (212-1) using the priority key A (214-1) as priority A (216-1). Similarly, this process may repeat for application B (210-2), application C (210-3), and application D (210-4) respectively.

As illustrated, the modifying system (202) includes an obtaining engine (204-1). The obtaining engine (204-1) obtains flow classes (212) via priority keys (214). For example, the obtaining engine (204-1) obtains flow class A (212-1) for application A (210-1) via priority key A (214-1). Similarly, the obtaining engine (204-1) obtains flow class B (212-2) for application B (210-2), flow class C (212-3) for application C (210-3), and flow class D (212-4) for application D (210-4) via their priority keys (214-2, 214-3, 214-4 respectively).

As illustrated in FIG. 2, modifying system (202) includes a validating engine (204-7). The validating engine (204-7) validates at least one flow modification rule against registered parameters of at least one of the flow classes (212) of the applications (210) to determine a flow of traffic based on the priority (216). In one example, the validating engine (204-7) validates at least one flow modification rule against registered parameters of at least one of the flow classes (212) of the applications (210) to determine a flow of traffic based on the priority (216) by approving the at least one flow modification rule of the applications (210) or prohibiting the at least one flow modification rule of the application (210). In one example, applications A's request for a flow modification rule and application B's request for a flow modification rule is to execute at the same time on the same switch. As mentioned above, application B now has a higher priority than application A. As a result, the validating engine (204-7) validates the flow modification rule of application B (210-2) to determine a flow of traffic based on priority B (216-2) by approving the flow modification rule of application B (210-2). Further, the validating engine (204-7) prohibits flow modification rule of application A (210-1).

In one example, approving the flow modification rule of application B (210-2) includes replacing priority key B (214-2) in the flow modification rule with priority B (216-2) of application B (210-2) to allow the flow modification rule of application (210) to execute at the correct switch. For example, switch one (220-1). In one example, prohibiting flow class A (212-1) of application A (210-1) includes preventing flow modification rule) of application A (210-1) from executing at the correct switch. In this example, switch one (220-1). However, the flow modification rule of application A (210-1) may execute after the flow modification rule of application B (210-2) has finished.

While this example was described with reference to modifying application B's priority such that priority key B is mapped to a new priority value, all the application's priorities may be modified if a single application's priority is modified. As a result, all the application's priority keys are mapped to new priority values.

Figure 3:
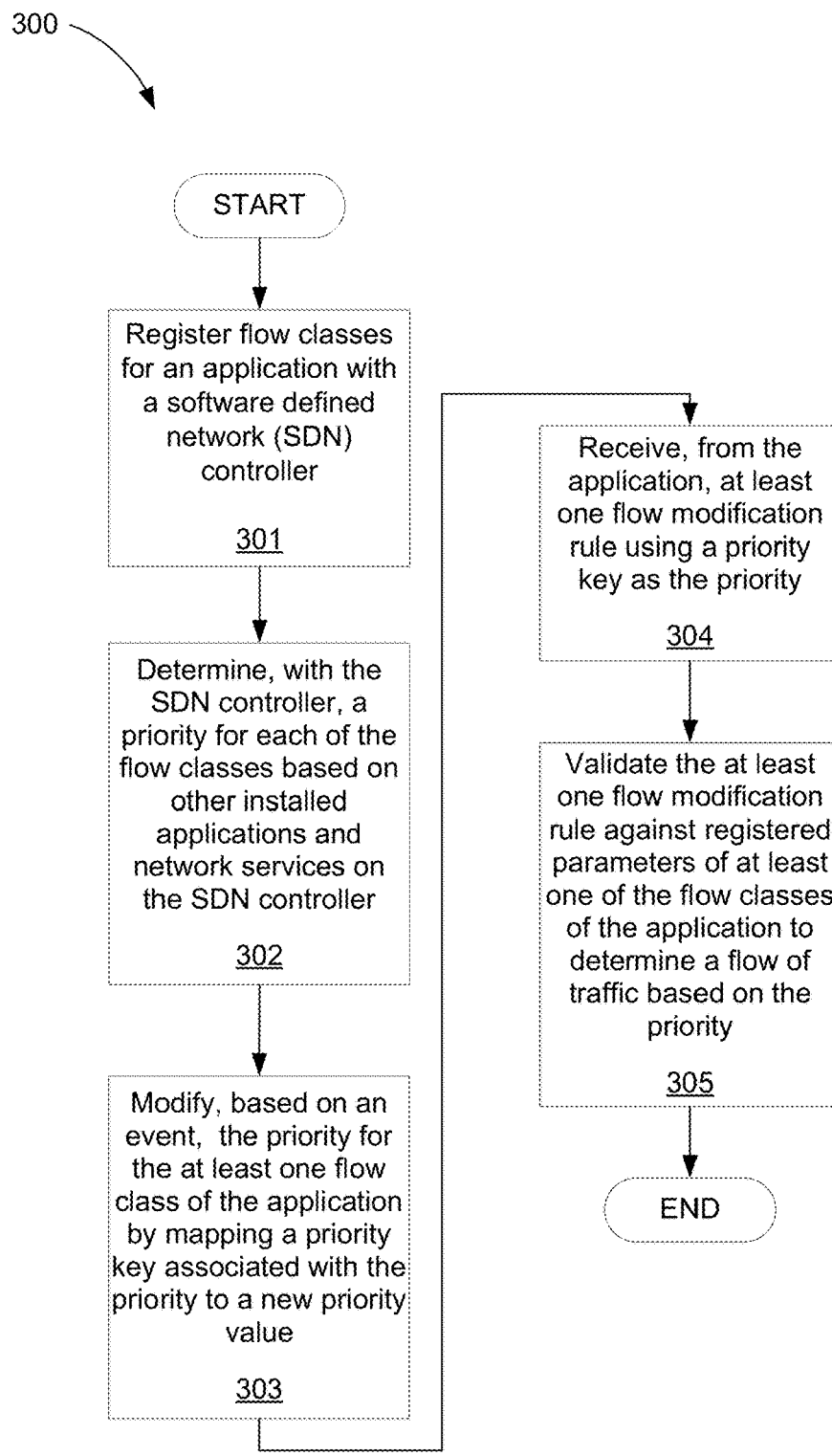
FIG. 3 is a flowchart of an example of a method for modifying a priority for at least one flow class of an application, according to one example of principles described herein.

FIG. 3 is a flowchart of an example of a method for modifying a priority for at least one flow class of an application, according to one example of principles described herein. In one example, the method (300) may be executed by the system (100) of FIG. 1. In other examples, the method (300) may be executed by other systems such as system 500 or system 600. In this example, the method (300) includes registering (301) flow classes for an application with a SDN controller, determining (302), with the SDN controller, a priority for each of the flow classes based on other installed applications and network services on the SDN controller, modifying (303), based on an event, the priority for the at least one flow class of the application by mapping a priority key associated with the priority to a new priority value, receiving (304), from the application, at least one flow modification rule using a priority key as the priority, and validating (305) the at least one flow modification rule against registered parameters of at least one of the flow classes of the application to determine a flow of traffic based on the priority.

As mentioned above, the method (300) includes registering (301) flow classes for an application with a SDN controller. As mentioned above, a number of applications may be installed on a SDN controller. In one example, once the applications are installed on the SDN controller, a registering engine automatically registers at least one flow class for each of the applications on the SDN controller. In another example, the once the applications are installed on the SDN controller, a registering engine provides a UI to a user to allow the user to register the flow classes for each of the applications. In this example the UI may include text boxes to allow the user to input the flow class for each of the applications. Further, in other example, other methods and techniques may be used to register at least one flow class for an application with the SDN controller. By registering at least one flow class for each of the applications with the SDN controller, the applications may be able to account for each other's business logic. As mentioned above, in other examples, the method (300) allows flow classes for applications not installed directly on the SDN controller to be registered with the SDN controller.

As mentioned above, the method (300) includes determining (302), with the SDN controller, a priority for each of the flow classes based on other installed applications and network services on the SDN controller. In one example, a determining engine is used to determine a priority for each of the flow classes associated with the applications.

As mentioned above, the priority may be used to determine an order of evaluation for flow modification rules at a switch. For example, the higher the priority the earlier the flow modification rules is executed at the switch. In one example, the priority may be a range from 0 to 10, where 0 indicates the lowest priority and 10 indicates the highest priority. In another example, the priority may be expressed symbolically. For example, a priority with the lowest significance may be assigned a low priority. A priority with the highest significance may be assigned a high priority.

As a result, each of the application's flow classes may be assigned a priority that will not conflict with another application's priority when a request for a flow modification rule is made. Further, the request may be made as a flow modification message.

As mentioned above, the method (300) includes modifying (303), based on an event, the priority for the at least one flow class of the application by mapping a priority key associated with the priority to a new priority value. In one example, the event may be a user overriding a priority's priority key to be associated with a new priority value via a file or a UI. In another example, the event may be based on modification to the SDN network such as adding or removing a switch from the SDN network.

As mentioned above, the method (300) includes receiving (304), from the application, at least one flow modification rule using a priority key as the priority. The priority key may be a ticket that the application includes when sending a request for a flow modification rule. In one example, the priority key may be used to identify a flow class, identify a user who owns a particular flow class, lookup appropriate metadata, or combinations thereof. In one example, the priority key may be included in a priority field of a request.

As mentioned above, the method (300) includes validating (305) the at least one flow modification rule against registered parameters of at least one of the flow classes of the application to determine a flow of traffic based on the priority. In one example, a validating engine may be used to validate the at least one flow modification rule against registered parameters of at least one of the flow classes of the application to determine the flow of the traffic based on the priority. In this example, the validating engine approves the at least one flow modification rule of the application or prohibits the at least one flow modification rule of the application. In one example, the validating engine compares the requested flow modification rule with the flow class to determine if the flow modification rule is to be approved or prohibited.

In one example, if the flow modification rule is approved, the validating engine replaces the priority key in the flow modification rule with the priority of the application to allow the at least one flow modification rule of the application to execute at the correct switch. In this example, the correct switch may be the intended switch in the SDN network. In this example, the validating engine replaces the priority key in the flow modification rule with the priority of the application to allow the at least one flow modification rule of the application to execute at the correct switch before sending the flow modification rule to the correct switch.

In one example, if the flow modification rule is prohibited, the validating engine prevents the at least one flow modification rule of the application from executing at the correct switch. In one example, the validating engine prevents the at least one flow modification rule of the application from executing at the correct switch by not allowing the SDN controller to forward the flow modification rule to the correct switch.

Figure 4:
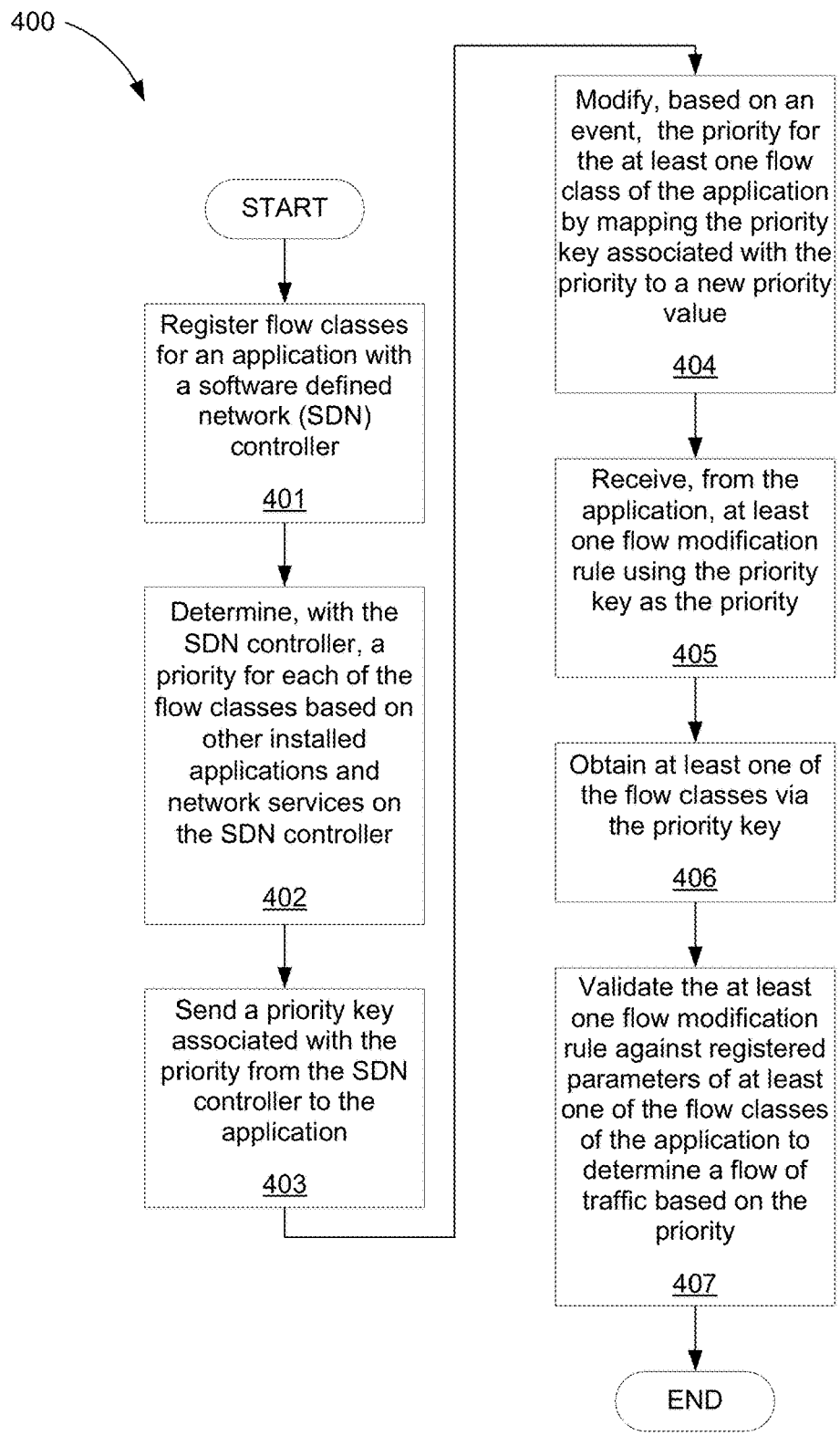
FIG. 4 is a flowchart of an example of a method for modifying a priority for at least one flow class of an application, according to one example of principles described herein.

FIG. 4 is a flowchart of an example of a method for modifying a priority for at least one flow class of an application, according to one example of principles described herein. In one example, the method (400) may be executed by the system (100) of FIG. 1. In other examples, the method (400) may be executed by other systems such as system 500 or system 600. In this example, the method (400) includes registering (401) flow classes for the application with a SDN controller, determining (402), with the SDN controller, a priority for each of the flow classes based on other installed applications and network services on the SDN controller, sending (403) a priority key associated with the priority from the SDN controller to the application, modifying (404), based on an event, the priority for the at least one flow class of the application by mapping the priority key associated with the priority to a new priority value, receiving (405), from the application, at least one flow modification rule using the priority key as the priority, obtaining (406) at least one of the flow classes via the priority key, and validating (407) the at least one flow modification rule against registered parameters of at least one of the flow classes of the application to determine a flow of traffic based on the priority.

As mentioned above, the method (400) includes sending (403) the priority key associated with the priority from the SDN controller to the application. As mentioned above, the method (400) determines, with the SDN controller, the priority for the at least one flow class based on other installed applications and network services on the SDN controller. Once the priority for at least one flow class based on other installed applications and network services on the SDN controller is determined, a priority key associated with the priority is sent from the SDN controller to the application. As a result, when an application sends a request, the application includes the priority key in the request.

As mentioned above, the method (400) includes obtaining (406) at least one of the flow classes via the priority key. In one example, an obtaining engine obtains at least one of the flow classes via the priority key when a flow modification request is made. For example, if four applications, namely application A, application B, application C, and application D, are installed on the SDN controller, the obtaining engine obtains a flow class for application A via the priority key for application A, a flow class for application B via the priority key for application B, a flow class for application C via the priority key for application C, and a flow class for application D via the priority key for application D.

Figure 5:
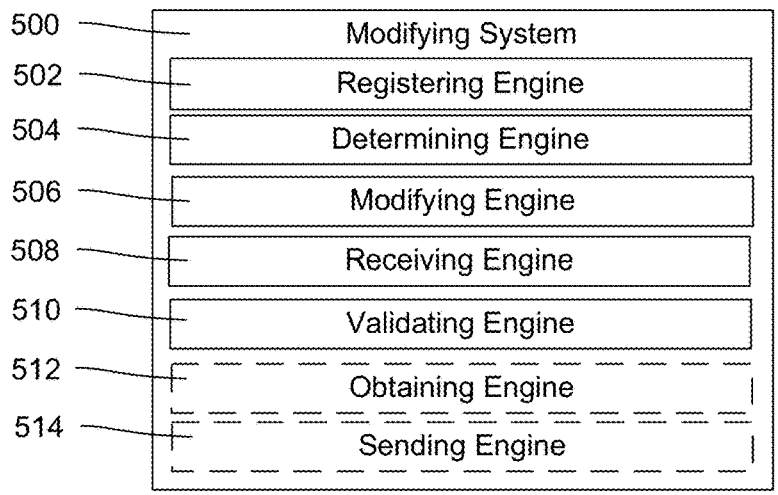
FIG. 5 is a diagram of an example of a modifying system, according to one example of principles described herein.

FIG. 5 is a diagram of an example of a modifying system, according to one example of principles described herein. The modifying system (500) includes a registering engine (502), a determining engine (504), a modifying engine (506), receiving engine (508), and a validating engine (510). In this example, the modifying system (500) also includes an obtaining engine (512) and a sending engine (514). The engines (502, 504, 506, 508, 510, 512, 514) refer to a combination of hardware and program instructions to perform a designated function. Each of the engines (502, 504, 506, 508, 510, 512, 514) may include a processor and memory. The program instructions are stored in the memory and cause the processor to execute the designated function of the engine.

The registering engine (502) registers flow classes for the application with a SDN controller. In one example, the registering engine (502) registers one flow class for the application with the SDN controller. In another example, the registering engine (502) registers several flow classes for the application with the SDN controller.

The determining engine (504) determines, with the SDN controller, a priority for each of the flow classes based on other installed applications and network services on the SDN controller. In one example, the determining engine (504) determines, with the SDN controller, one priority for thee flow class based on other installed applications and network services on the SDN controller.

The modifying engine (506) modifies, based on an event, the priority for the at least one flow class of the application by mapping a priority key associated with the priority to a new priority value. In one example, the modifying engine (506) modifies, based on one event, the priority for the at least one flow class of the application by mapping a priority key associated with the priority to a new priority value. In another example, the modifying engine (506) modifies, based on several events, the priority for the at least one flow class of the application by mapping a priority key associated with the priority to a new priority value.

The receiving engine (508) receives, from the application, at least one flow modification rule using the priority key as the priority. In one example, the receiving engine (508) receives, from several applications, several flow modification rules using several priority keys as the priorities.

The validating engine (510) validates the at least flow modification rule against registered parameters of at least one of the flow classes of the application to determine a flow of traffic based on the priority. In one example, the validating engine (510) validates several flow modification rules of the applications to determine a flow of traffic based on several priorities. In one example, the validating engine (508) validates a flow modification rule against registered parameters of at least one of the flow classes of the application to determine the flow of the traffic based on the priority by approving at least one flow modification rule of the application or prohibiting at least one flow modification rule of the application. In one example, approving at least one flow modification rule of the application includes replacing the priority key in the flow modification rule with the priority of the application to allow the at least one flow modification rule of the application to execute at a switch. Further, prohibiting the at least one flow modification rule of the application includes preventing at least one flow modification rule of the application from executing at a switch.

The obtaining engine (512) obtains flow classes via a priority key. In one example, the obtaining engine (512) obtains one flow class for the application via a priority key. In another example, the obtaining engine (512) obtains several flow classes for the application via priority keys.

The sending engine (514) sends a priority key associated with the priority from the SDN controller to the application. In one example, the sending engine (514) sends one priority key associated with the priority from the SDN controller to the application. In another example, the sending engine (514) sends several priority keys associated with the priorities from the SDN controller to the applications.

Figure 6:
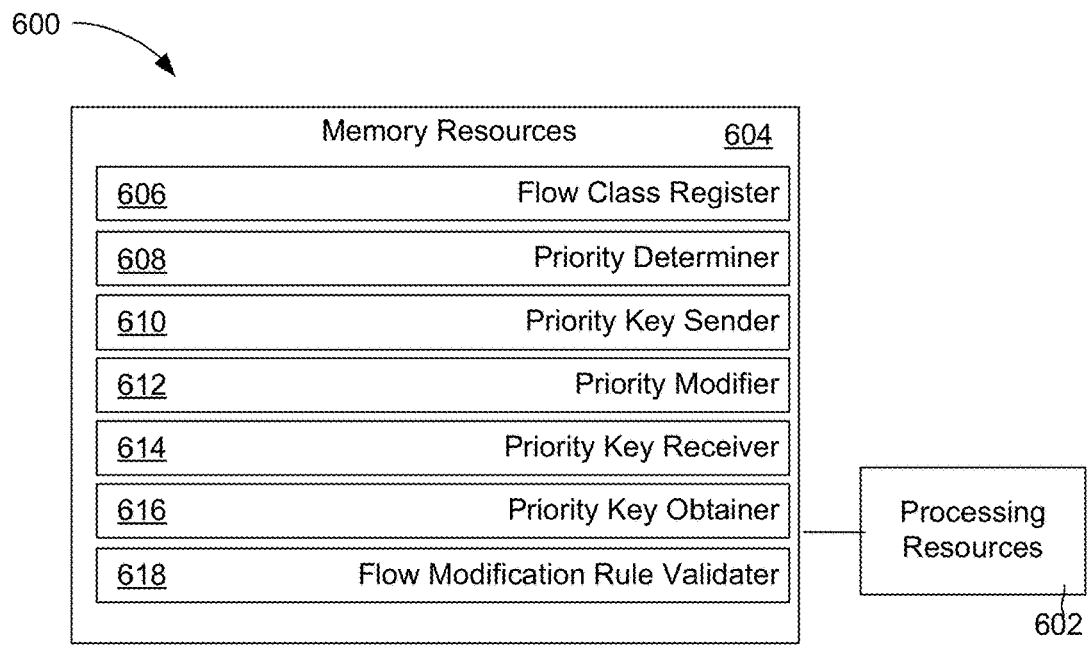
FIG. 6 is a diagram of an example of a modifying system, according to one example of principles described herein.

FIG. 6 is a diagram of an example of a modifying system, according to one example of principles described herein. In this example, modifying system (600) includes processing resources (602) that are in communication with memory resources (604). Processing resources (602) include at least one processor and other resources used to process programmed instructions. The memory resources (604) represent generally any memory capable of storing data such as programmed instructions or data structures used by the modifying system (600). The programmed instructions shown stored in the memory resources (604) includes a flow class register (606), a priority determiner (608), a priority key sender (610), a priority modifier (612), a priority key receiver (614), a flow class obtainer (616), and a flow modification rule validator (618).

The memory resources (604) include a computer readable storage medium that contains computer readable program code to cause tasks to be executed by the processing resources (602). The computer readable storage medium may be tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The flow class register (606) represents programmed instructions that, when executed, cause the processing resources (602) to register the flow classes for the application with a SDN controller. The priority determiner (608) represents programmed instructions that, when executed, cause the processing resources (602) to determine, with the SDN controller, a priority for each of the flow classes based on other installed applications and network services on the SDN controller.

The priority key sender (610) represents programmed instructions that, when executed, cause the processing resources (602) to send a priority key associated with the priority from the SDN controller to the application. The priority modifier (612) represents programmed instructions that, when executed, cause the processing resources (602) to modify, based on an event, the priority for the at least one flow class of the application by mapping a priority key associated with the priority to a new priority value.

The priority key receiver (614) represents programmed instructions that, when executed, cause the processing resources (602) to receive, from the application, at least one flow modification rule using the priority key as the priority. The flow class obtainer (616) represents programmed instructions that, when executed, cause the processing resources (602) to obtain flow classes via the priority key. The flow modification rule validator (618) represents programmed instructions that, when executed, cause the processing resources (602) to validate the at least one flow modification rule against registered parameters of at least one of the flow classes of the application to determine a flow of traffic based on the priority.

Further, the memory resources (604) may be part of an installation package. In response to installing the installation package, the programmed instructions of the memory resources (604) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (602) and the memory resources (602) are located within the same physical component, such as a server, or a network component. The memory resources (604) may be part of the physical component's main memory, caches, registers, non-volatile memory, or elsewhere in the physical component's memory hierarchy. Alternatively, the memory resources (604) may be in communication with the processing resources (602) over a network. Further, the data structures, such as the libraries, may be accessed from a remote location over a network connection while the programmed instructions are located locally. Thus, the modifying system (600) may be implemented on a user device, on a server, on a collection of servers, or combinations thereof.

The modifying system (600) of FIG. 6 may be part of a general purpose computer. However, in alternative examples, the modifying system (600) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method for modifying a priority for at least one flow class of an application, the method comprising:
   registering flow classes for the application with a software defined networking (SDN) controller, wherein the flow classes comprise a description of flow modification rules and a priority at which the flow modification rules are to be installed at a switch;
   determining, with the SDN controller, a priority for each of the flow classes based on other installed applications and network services on the SDN controller;
   modifying, based on an event, the priority for at least one of the flow classes of the application by mapping a priority key associated with the priority to a new priority value;
   receiving, from the application, at least one flow modification rule using the priority key as the priority; and
   validating the at least one flow modification rule against registered parameters of at least one of the flow classes of the application to determine a flow of traffic based on the priority.

2. The method of claim 1, in which validating the at least one flow modification rule against the registered parameters of at least one of the flow classes of the application to determine the flow of the traffic based on the priority comprises approving the at least one flow modification rule of the application or prohibiting the at least one flow modification rule of the application.

3. The method of claim 2, in which approving the at least one flow modification rule of the application comprises replacing the priority key in the at least one the flow modification rule with the priority of the application to allow the at least one flow modification rule of the application to execute at a switch.

4. The method of claim 2, in which prohibiting the at least one flow modification rule of the application comprises preventing the at least one flow modification rule of the application from executing at a switch.

5. The method of claim 1, further comprising sending the priority key associated with the priority from the SDN controller to the application.

6. The method of claim 1, further comprising obtaining the at least one of the flow classes via the priority key.

7. The method of claim 1, wherein the determining of the priority for each of the flow classes is to occur prior to the receipt, from the application, of the at least one flow modification rule that uses the priority key as the priority.

8. The method of claim 1, wherein the event is selected from a group of events consisting of: a user overriding a former priority key value of the priority key via a file; a user overriding the former priority key value of the priority key via a user interface; adding of a switch to an SDN network of the controller; and removing a switch from the SDN network of the controller.

9. A system for modifying a priority for at least one flow class of an application, the system comprising:
a registering engine to register flow classes for the application with a software defined networking (SDN) controller, wherein the flow classes comprise a description of flow modification rules and a priority at which the flow modification rules are to be installed at a switch;
a determining engine to determine, with the SDN controller, a priority for each of the flow classes based on other installed applications and network services on the SDN controller;
a sending engine to send a priority key associated with the priority from the SDN controller to the application;
a modifying engine to modify, based on an event, the priority for at least one of the flow classes of the application by mapping the priority key associated with the priority to a new priority value;
a receiving engine to receive, from the application, at least one flow modification rule using the priority key as the priority;
an obtaining engine to obtain at least one of the flow classes via the priority key; and
a validating engine to validate the at least one flow modification rule against registered parameters of the at least one of the flow classes of the application to determine a flow of traffic based on the priority.

10. The system of claim 9, in which the validating engine validates the at least one flow modification rule against the registered parameters of at least one of the flow classes of the application to determine the flow of the traffic based on the priority by approving the at least one flow modification rule of the application or prohibiting the at least one flow modification rule of the application.

11. The system of claim 10, in which approving the at least one flow modification rule of the application comprises replacing the priority key in the flow modification rule with the priority of the application to allow the at least one flow modification rule of the application to execute at a switch.

12. The system of claim 10, in which prohibiting the at least one flow modification rule of the application comprises preventing the at least one flow modification rule of the application from executing at a switch.

13. The system of claim 9, wherein the determining of the priority for each of the flow classes is to occur prior to the receipt, from the application, of the at least one flow modification rule that uses the priority key as the priority.

14. The system of claim 9, wherein the event is selected from a group of events consisting of: a user overriding a former priority key value of the priority key via a file; a user overriding the former priority key value of the priority key via a user interface; adding of a switch to an SDN network of the controller; and removing a switch from the SDN network of the controller.

15. A computer program product for modifying a priority for at least one flow class of an application, comprising:
a non-transitory tangible computer readable storage medium, the tangible computer readable storage medium comprising computer readable program code embodied therewith, the computer readable program code comprising program instructions that, when executed, causes a processor to:
register flow classes for the application with a software defined networking (SDN) controller, wherein the flow classes comprise a description of flow modification rules and a priority at which the flow modification rules are to be installed at a switch;
determine, with the SDN controller, a priority for each of the flow classes based on other installed applications and network services on the SDN controller;
modify, based on an event, the priority for at least one of the flow classes of the application by mapping a priority key associated with the priority to a new priority value;
obtain at least one of the flow classes via the priority key; and
validate at least one flow modification rule against registered parameters of at the least one of the flow classes of the application to determine a flow of traffic based on the priority.

16. The product of claim 15, further comprising computer readable program code comprising program instructions that, when executed, cause the processor to send the priority key associated with the priority from the SDN controller to the application.

17. The product of claim 15, further comprising computer readable program code comprising program instructions that, when executed, cause the processor to receive, from the application, the at least one flow modification rule using the priority key as the priority.

18. The product of claim 15, further comprising computer readable program code comprising program instructions that, when executed, cause the processor to approve the at least one flow modification rule of the application by replacing the priority key in the flow modification rule with the priority of the application to allow the at least one flow modification rule of the application to execute at a switch.

19. The product of claim 15, further comprising computer readable program code comprising program instructions that, when executed, cause the processor to prohibit the at least one flow modification rule of the application by preventing the at least one flow modification rule of the application from executing at a switch.

20. The product of claim 15, wherein the event is selected from a group of events consisting of: a user overriding a former priority key value of the priority key via a file; a user overriding the former priority key value of the priority key via a user interface; adding of a switch to an SDN network of the controller; and removing a switch from the SDN network of the controller.

* * * * *